W. P. GREGG.

Roller-Skates.

No. 5,707. Reissued Dec. 23, 1873.

Witnesses.

Geo Gray

F. E. Hale.

W. P. Gregg by his attorney.

F. P. Hale

AM. PHOTO-LITHOGRAPHIC Co. N.Y. (OSBORNE'S PROCESS)

UNITED STATES PATENT OFFICE.

WASHINGTON PARKER GREGG, OF BOSTON, MASSACHUSETTS.

IMPROVEMENT IN ROLLER-SKATES.

Specification forming part of Letters Patent No. 48,929, dated July 25, 1865; reissue No. 5,707, dated December 23, 1873; application filed November 12, 1873.

*To all whom it may concern:*

Be it known that I, WASHINGTON PARKER GREGG, of Boston, in the county of Suffolk and State of Massachusetts, have invented certain new and useful Improvements in Roller-Skates; and do hereby declare that the following description with the accompanying drawings forms a full, clear, and exact specification thereof.

My improvements consist in a novel construction of the roller-skate, as hereinafter described and claimed.

Figure 1:
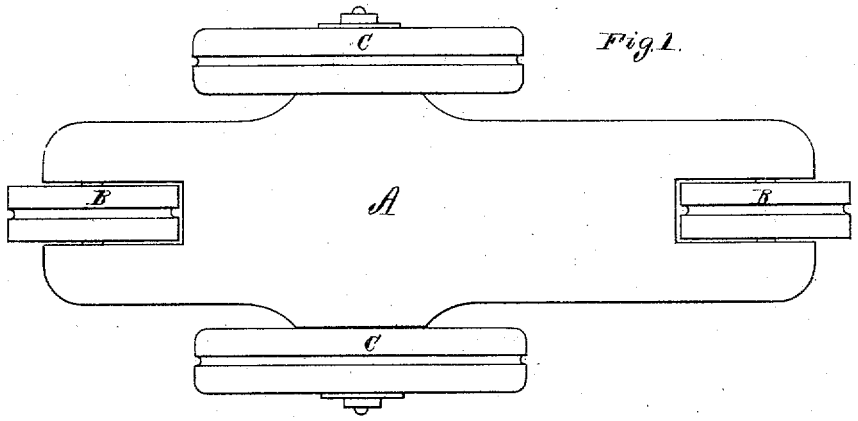
Figure 2:
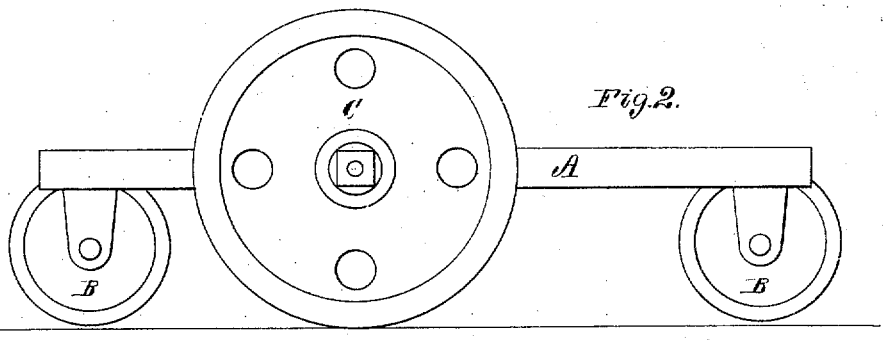
Figure 3:
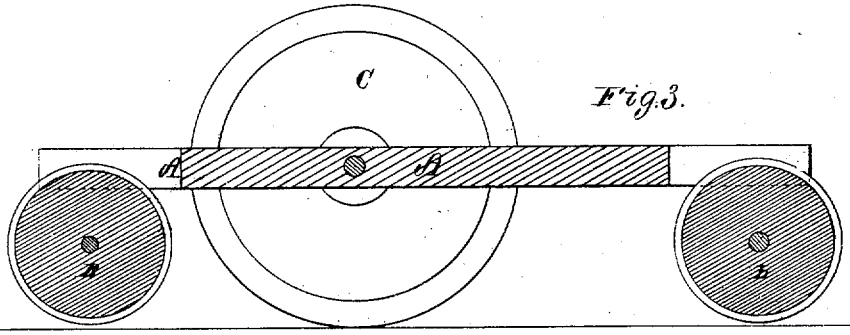
Figure 4:
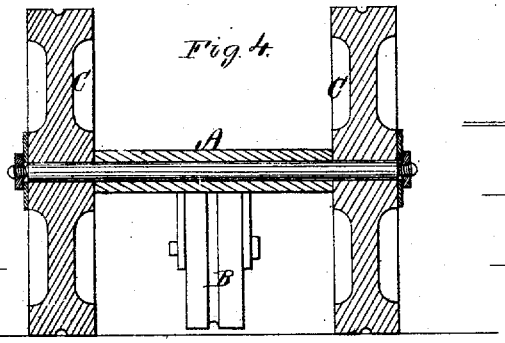

The accompanying drawings exhibit the stock or foot-rest and the rollers of a skate embodying my improvements. Of such drawings, Figure 1 exhibits the skate in top view, Fig. 2 in side elevation, Fig. 3 in longitudinal section, and Fig. 4 in transverse section.

In carrying out my invention, I make the stock or foot-rest A of the skate of metal, wood, or other suitable material or materials, and of any desirable form, and with any simple attachment for fastening it to the foot of a person, combining lightness, strength, and security. I arrange two comparatively small rollers, B B, for support, one partly under the heel, and the other partly under the toe of the stock, and I also arrange two comparatively large rollers, C C, for driving one on each side of the stock or foot-rest, under the arch of the foot, near the line of gravity of the skater. I make the rollers, their axles, and connections or fastenings of metal or wood, or partly of both, solid or otherwise, securing strength, lightness, and durability. The size of the stock is adapted to the foot, and the size of the rollers may be varied according to the skill of the skater and the quality or state of the skating-surface. For common purposes the smaller rollers may be three inches in diameter and one inch in width on the periphery, and the larger rollers may be five inches in diameter and one inch in width on the periphery. The axles or journals of the side rollers project from the stock. These rollers enable the skate to run with greater ease and rapidity than it could by means of the heel and toe rollers alone. They are so arranged that their peripheries or the bearing surfaces thereof shall be a little lower than those of the heel and toe rollers, in order that the skater may drive himself, while skating, by means of the large rollers.

Roller-skates thus constructed run with great ease and rapidity, and do not injuriously sprain the feet, nor weary the limbs, and they will not easily tip backward or forward, and they impart from the first an unusual feeling of security to the skater in all possible movements.

This skate is well adapted to hard sidewalks, large halls, gymnasiums, and skating-schools, and in suitable places for traveling purposes.

Having described my invention, what I claim for roller-skating purposes, is as follows:

1. A skate-stock or foot-rest having a driving-wheel, constructed as described, disposed on an outer axle, at either side of the stock, at or near the middle, the upper parts of the peripheries of said driving-wheels extending above the level of the stock, as described and shown.

2. A roller-skate, constructed with a stock or foot-rest, having a small supporting-roller under each end, and a larger driving-wheel disposed on an outer axle at each side of the stock, the upper portions of the peripheries of the driving-wheels extending above the level of the stock or foot-rest, as described.

3. In a roller-skate provided with a stock, having a supporting-roller under each end and a larger driving-roller on each side thereof, the arrangement of the driving-rollers, so that their peripheries or bearing surfaces shall be in a plane lower than the heel and toe rollers, as specified.

WASHINGTON PARKER GREGG.

Witnesses:

F. P. HALE,

F. H. JENNEY.